(12) United States Patent
Whitley et al.

(10) Patent No.: US 8,464,874 B2
(45) Date of Patent: Jun. 18, 2013

(54) SAND CLEANING APPARATUS AND METHOD

(75) Inventors: Ralph E. Whitley, Huntersville, NC (US); Dan Bard, Gastonia, NC (US); Ben Causby, Maiden, NC (US); Ricky Dale Jones, Dallas, NC (US); Eric Lee, Maiden, NC (US); Keith Lee, Newton, NC (US); Mike Lee, Newton, NC (US); Bill Wilkens, Stanley, NC (US)

(73) Assignee: VT Leeboy, Inc., Lincolnton, NC (US)

( * ) Notice: Subject to any disclaimer, the term of this patent is extended or adjusted under 35 U.S.C. 154(b) by 0 days.

(21) Appl. No.: 13/160,240

(22) Filed: Jun. 14, 2011

(65) Prior Publication Data
US 2012/0318720 A1  Dec. 20, 2012

(51) Int. Cl.
*B07B 1/49* (2006.01)

(52) U.S. Cl.
USPC ........... 209/421; 209/235; 209/247; 209/509; 171/25; 171/111; 171/126

(58) Field of Classification Search
USPC .................... 209/235, 247, 421; 171/25, 111, 171/126; 371/142.5
See application file for complete search history.

(56) References Cited

U.S. PATENT DOCUMENTS

| | | | |
|---|---|---|---|
| 2,514,945 A | 7/1950 | Fortier | |
| 2,639,022 A | 5/1953 | MacDonald | |
| 2,976,936 A | 3/1961 | Fry | |
| 3,316,977 A | 5/1967 | Snook | |
| 4,014,390 A * | 3/1977 | Teixeira | 171/124 |
| 4,153,555 A | 5/1979 | Acker et al. | |
| 4,157,016 A | 6/1979 | Wendt et al. | |
| 4,167,975 A * | 9/1979 | Fahrenholz | 171/12 |
| 4,482,019 A * | 11/1984 | Murphy | 171/63 |
| 4,993,498 A | 2/1991 | Fresnel | |
| 5,120,433 A | 6/1992 | Osadchuk | |
| 5,133,413 A * | 7/1992 | Baxter | 171/63 |
| 5,183,160 A * | 2/1993 | McClain | 209/234 |
| 5,184,916 A * | 2/1993 | Thoer | 405/128.1 |
| 5,195,260 A | 3/1993 | Osadchuk | |
| 5,197,211 A * | 3/1993 | Haug | 37/305 |
| 5,220,965 A | 6/1993 | Haug | |
| 5,363,574 A | 11/1994 | Osadchuk | |
| 5,430,962 A | 7/1995 | Osadchuk | |
| 5,540,003 A | 7/1996 | Osadchuk | |
| 5,741,087 A | 4/1998 | Osadchuk | |
| 6,094,847 A | 8/2000 | Gallenberg | |
| 6,318,930 B1 | 11/2001 | Scudder | |

(Continued)

*Primary Examiner* — Terrell Matthews
(74) *Attorney, Agent, or Firm* — Moore & Van Allen PLLC

(57) ABSTRACT

In general terms, embodiments of the present invention relate to methods and apparatuses for cleaning, grooming, and otherwise maintaining sand and sandy surfaces. For example, some embodiments of the present invention provide an apparatus for cleaning a sandy surface, where the sandy surface includes unsifted sand, and where the unsifted sand includes sand and unwanted material. In some embodiments, the apparatus includes: (a) one or more frames; (b) a conveyor carried by the one or more frames and including a first portion and a second portion, where the conveyor is configured to transport the unsifted sand from the first portion towards the second portion; (c) at least one paddle carried by the one or more frames and configured to direct the unsifted sand from the sandy surface towards the conveyor; and (d) a sifter carried by the one or more frames and configured to: (i) receive the unsifted sand from the conveyor; (ii) prevent the unwanted material from passing through the sifter; and (iii) allow the sand to pass through the sifter.

28 Claims, 7 Drawing Sheets

U.S. PATENT DOCUMENTS

| | | | |
|---|---|---|---|
| 6,502,333 B1 * | 1/2003 | Striegel | 37/142.5 |
| 6,805,204 B2 | 10/2004 | Bauer et al. | |
| 7,186,059 B2 * | 3/2007 | Barnes | 405/175 |
| 2009/0223683 A1 * | 9/2009 | Davidson et al. | 171/18 |

* cited by examiner

SAND CLEANING APPARATUS AND METHOD

FIELD

In general terms, embodiments of the present invention relate to methods and apparatuses for cleaning, grooming, and otherwise maintaining sand and sandy surfaces.

BACKGROUND

Managers of public beaches, private beach resorts, golf courses, and other sandy surfaces are confronted with the significant challenge of cleaning, grooming, and otherwise maintaining those sandy surfaces on a regular basis. For example, after a period of heavy use, a popular beach area may be littered with beverage cans, food wrappers, cigarette butts, and other trash. As another example, sand bunkers on golf courses may collect plant debris, trash, and other unwanted material. Unless these sandy surfaces are maintained on a regular basis, they may fall into disrepair and/or the frequency of their use may diminish. Sandy surfaces can also be affected, from time to time, by natural or environmental disasters that may leave those sandy surfaces littered with debris, contaminated with oil, or otherwise accumulating unwanted material. Without fast, effective, and aggressive cleanup operations, sandy surfaces subjected to these kinds of disasters may be permanently ruined.

Unfortunately, when confronted with these various challenges, the sand cleaning apparatuses in use today are inadequate. For example, many conventional beach cleaning apparatuses are only configured to collect trash that accumulates on the beach surface, thereby missing trash, tar balls, contaminants, and other unwanted material that may exist just below the beach surface. Other conventional beach cleaning apparatuses cannot perform their cleaning functions without sinking into the sand, disrupting the natural grading of the sand, or otherwise substantially damaging the beach ecosystem. Thus, there is a need to provide methods and apparatuses for effectively cleaning, grooming, and otherwise maintaining sandy surfaces, such as beaches, with minimal disruption of those sandy surfaces following cleaning.

SUMMARY OF SELECTED EMBODIMENTS OF THE PRESENT INVENTION

In general terms, embodiments of the present invention relate to methods and apparatuses for cleaning, grooming, and otherwise maintaining sand and sandy surfaces. For example, in some embodiments, a sand cleaning apparatus is provided that is configured to travel along a beach parallel to the waterline, collect unsifted sand (e.g., sand plus unwanted material), sift the unsifted sand, and then redeposit the sifted sand back onto the beach. In addition to collecting trash, rocks, debris, and other unwanted material from the beach, the apparatus is also capable of collecting tar balls and otherwise cleaning sand that has been contaminated with oil and/or other hydrocarbons. In addition, the sand cleaning apparatus is relatively light-weight, meaning that the apparatus is able to perform its collecting and sifting functions without substantially disrupting the grading of the sand, without sinking into the sand, and/or without otherwise substantially damaging the beach ecosystem.

Some embodiments of the present invention provide an apparatus for cleaning a sandy surface, where the sandy surface includes unsifted sand, and where the unsifted sand includes sand and unwanted material. In some embodiments, the apparatus includes: (a) one or more frames; (b) a conveyor carried by the one or more frames and including a first portion and a second portion, where the conveyor is configured to transport the unsifted sand from the first portion towards the second portion; (c) at least one paddle carried by the one or more frames and configured to direct the unsifted sand from the sandy surface towards the conveyor; and (d) a sifter carried by the one or more frames and configured to: (i) receive the unsifted sand from the conveyor; (ii) prevent the unwanted material from passing through the sifter; and (iii) allow the sand to pass through the sifter.

Other embodiments of the present invention provide a method for cleaning a sandy surface, where the sandy surface includes unsifted sand, and where the unsifted sand includes sand and unwanted material. In some embodiments, the method includes: (a) directing the unsifted sand from the sandy surface onto a conveyor; (b) transporting, using the conveyor, the unsifted sand into a sifter; and (c) sifting, using the sifter, the unsifted sand so that the sand is separated from the unwanted material.

Still other embodiments of the present invention provide an assembly for sifting unsifted sand located on a sandy surface, where the unsifted sand includes sand and at least one tar ball. In some embodiments, the assembly includes: (a) a moveable frame configured to move over the sandy surface; (b) a sifter housing carried by the frame; (c) at least one sifter carried by the sifter housing and configured to prevent the at least one tar ball from passing through the at least one sifter; and (d) a receptacle carried by the sifter housing or the frame, where the receptacle is configured to receive, and at least temporarily carry, the at least one tar ball.

Other embodiments of the present invention provide an apparatus for sifting unsifted sand located on a sandy surface, where the unsifted sand includes sand and unwanted material. In some embodiments, the apparatus includes: (a) an auger configured to direct the unsifted sand from the sandy surface towards at least one paddle; (b) the at least one paddle configured to direct the unsifted sand towards a sifter; and (c) the sifter configured to prevent the unwanted material from passing through the sifter. In some of these embodiments, the width of the auger is greater than the width of the at least one paddle, such that the apparatus sifts a larger area of the sandy surface defined by the width of the auger as opposed to a smaller area of the sandy surface defined by the width of the at least one paddle.

BRIEF DESCRIPTION OF THE FIGURES

Figure 1:
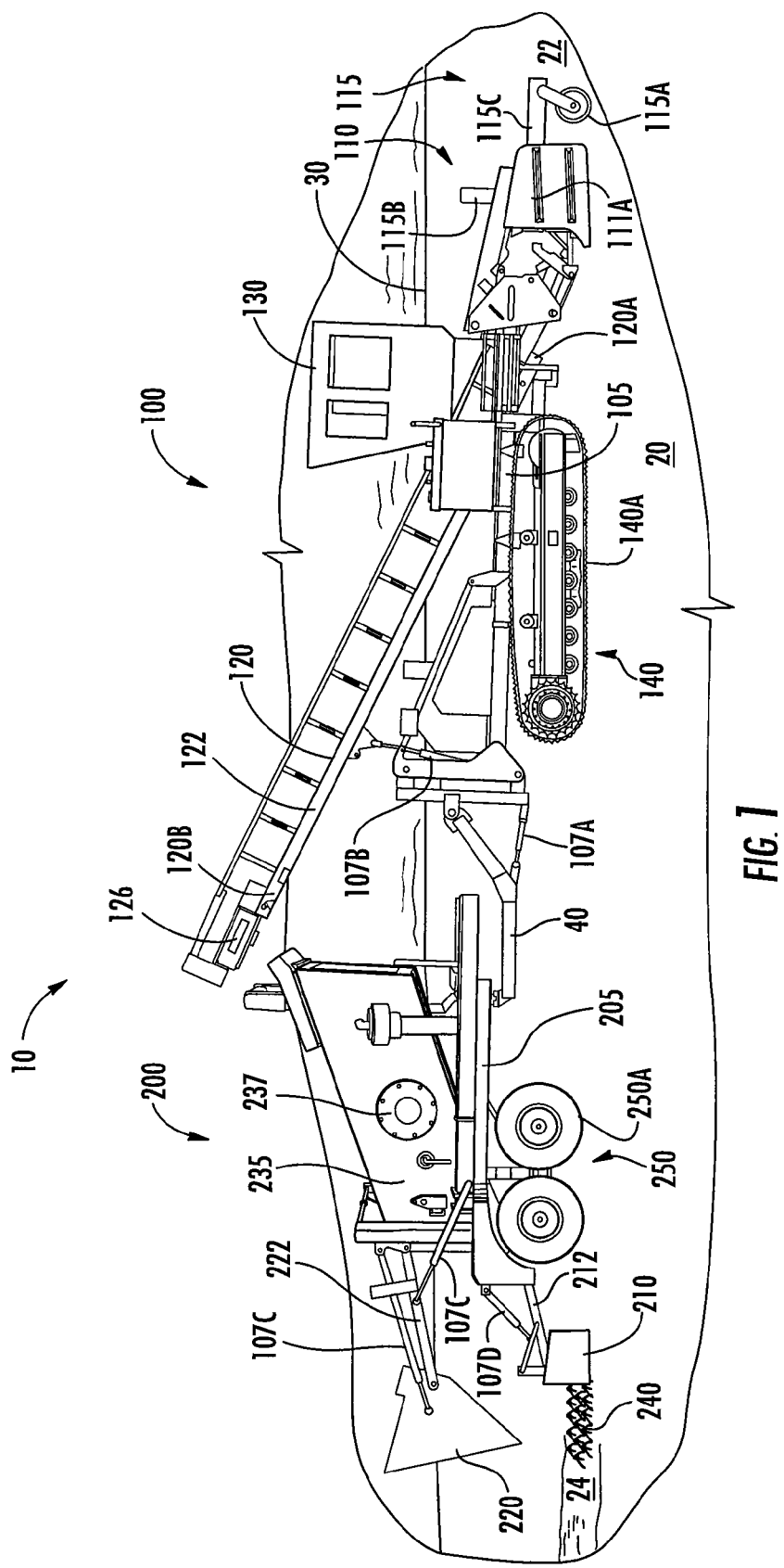
Figure 2:
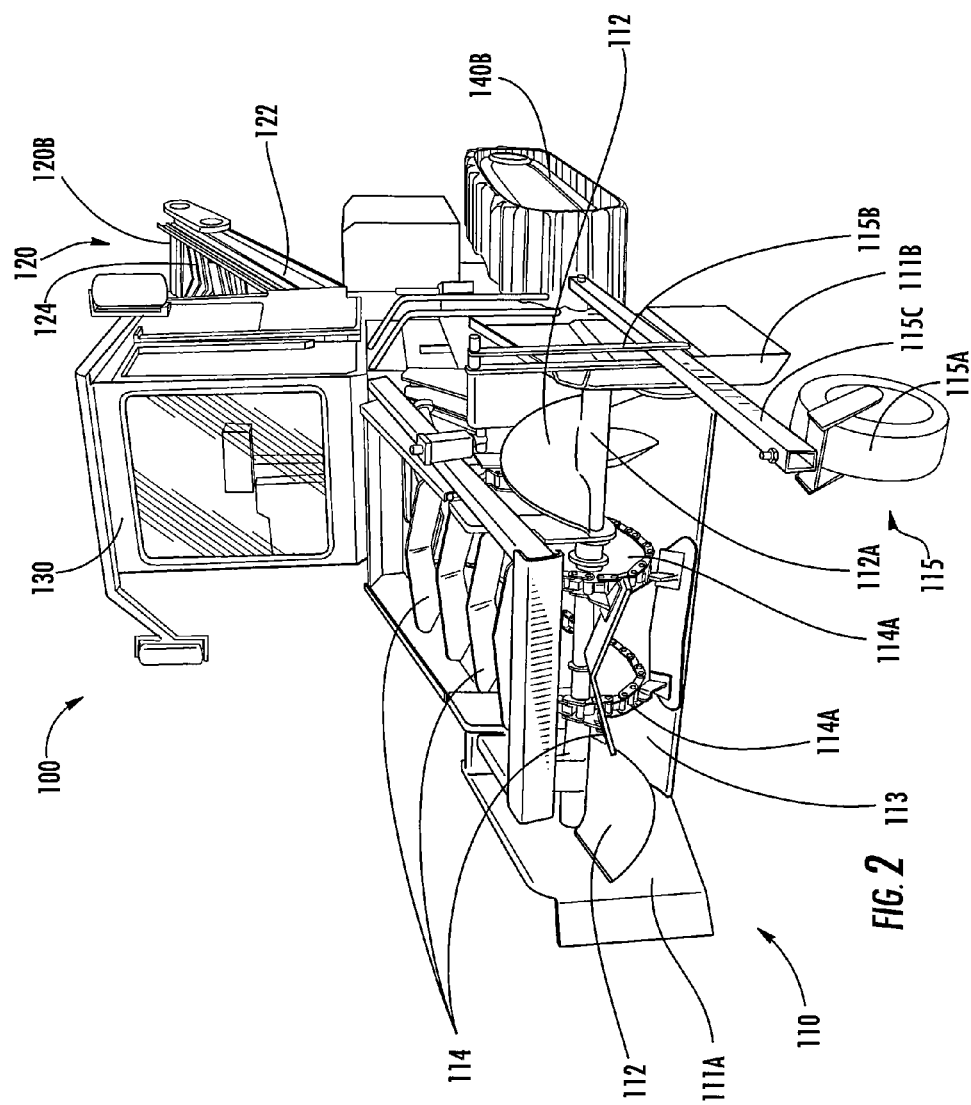
Figure 3:
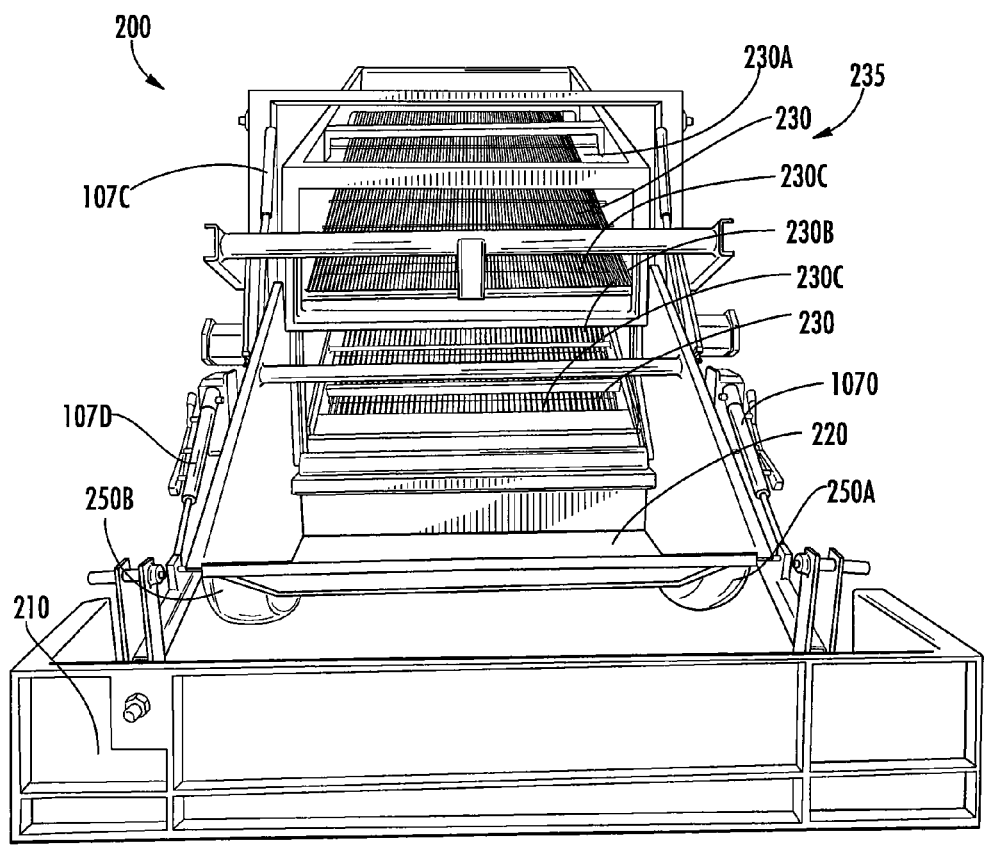
Figure 4:
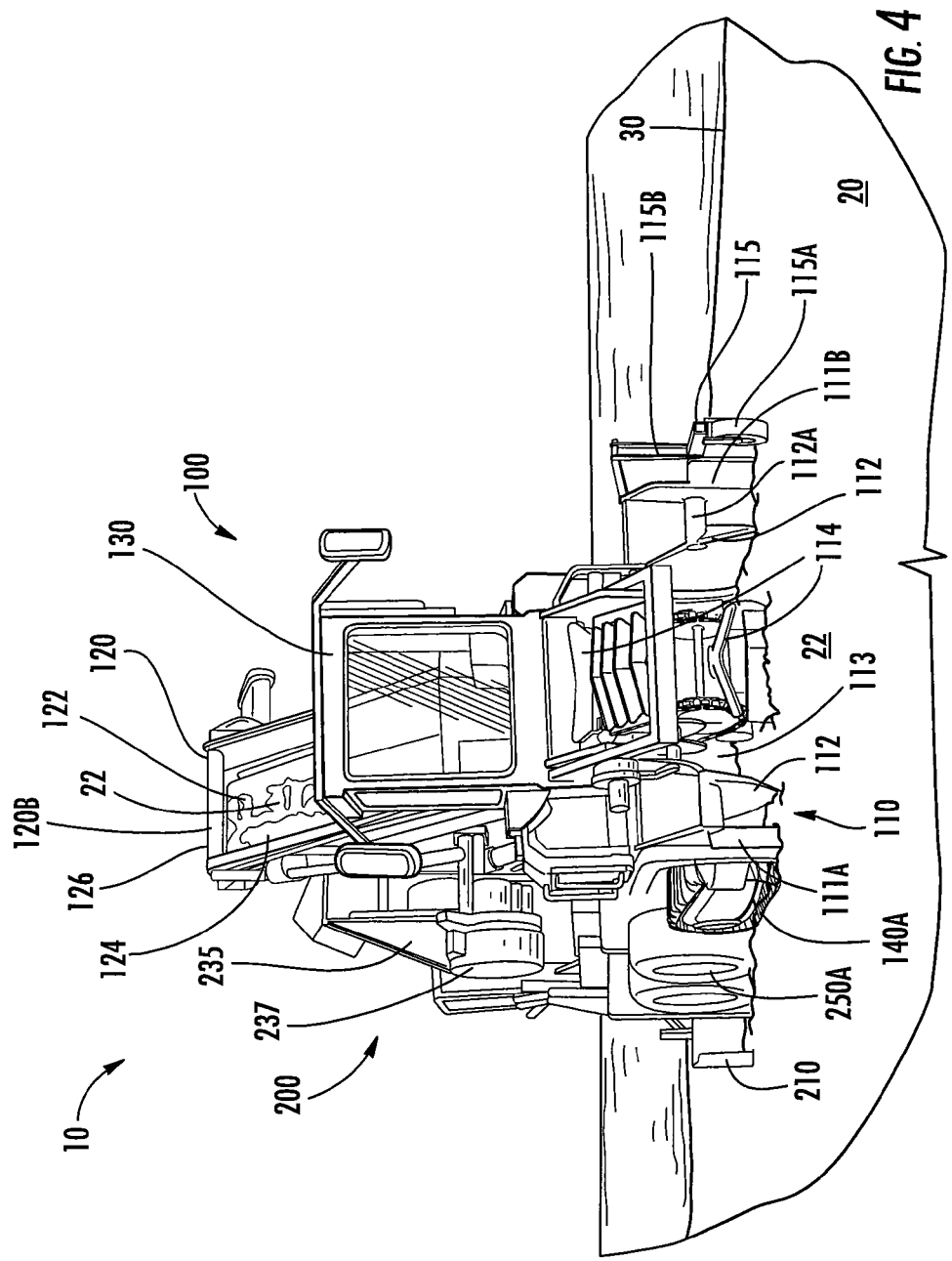
Figure 5:
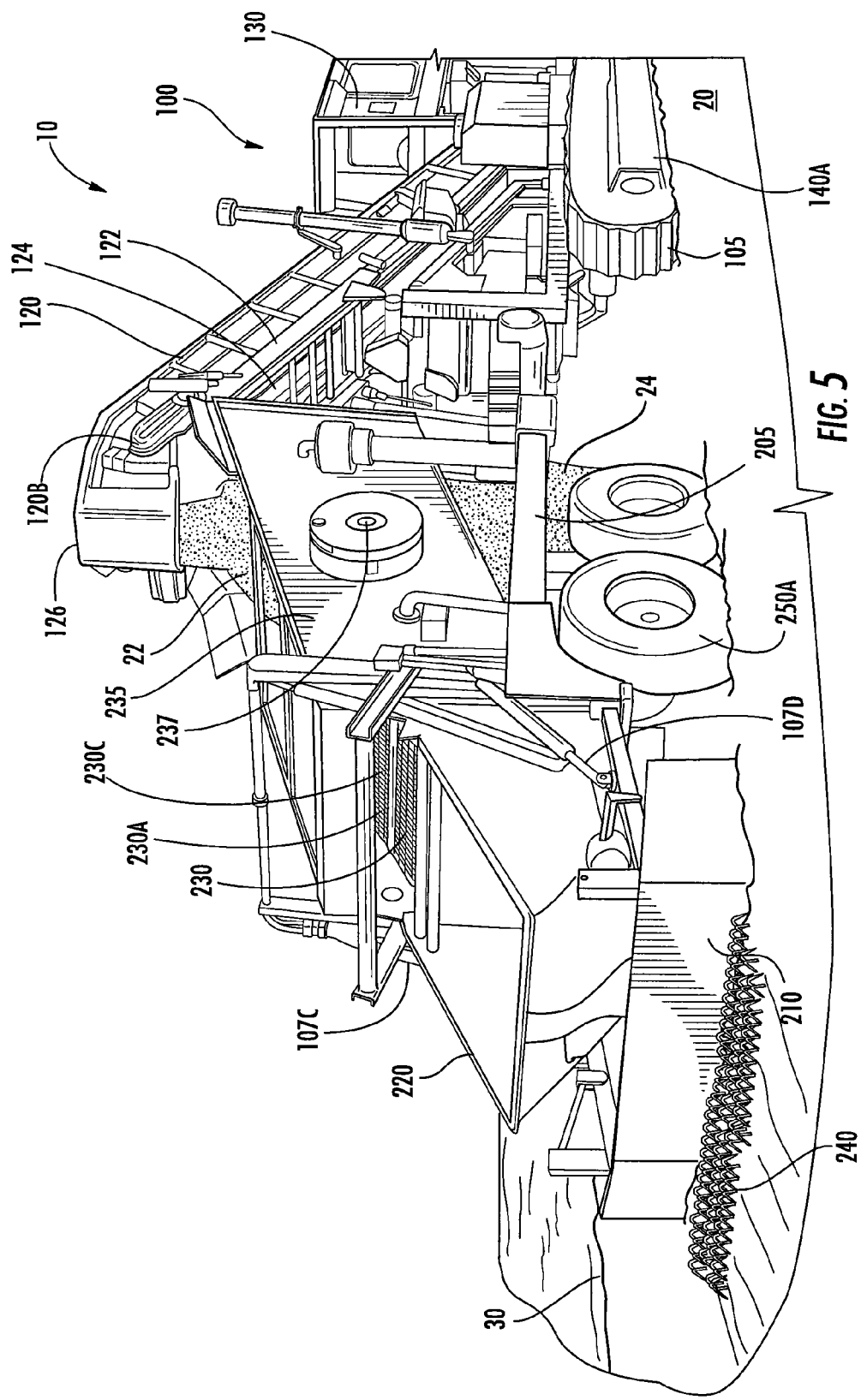
Figure 6:
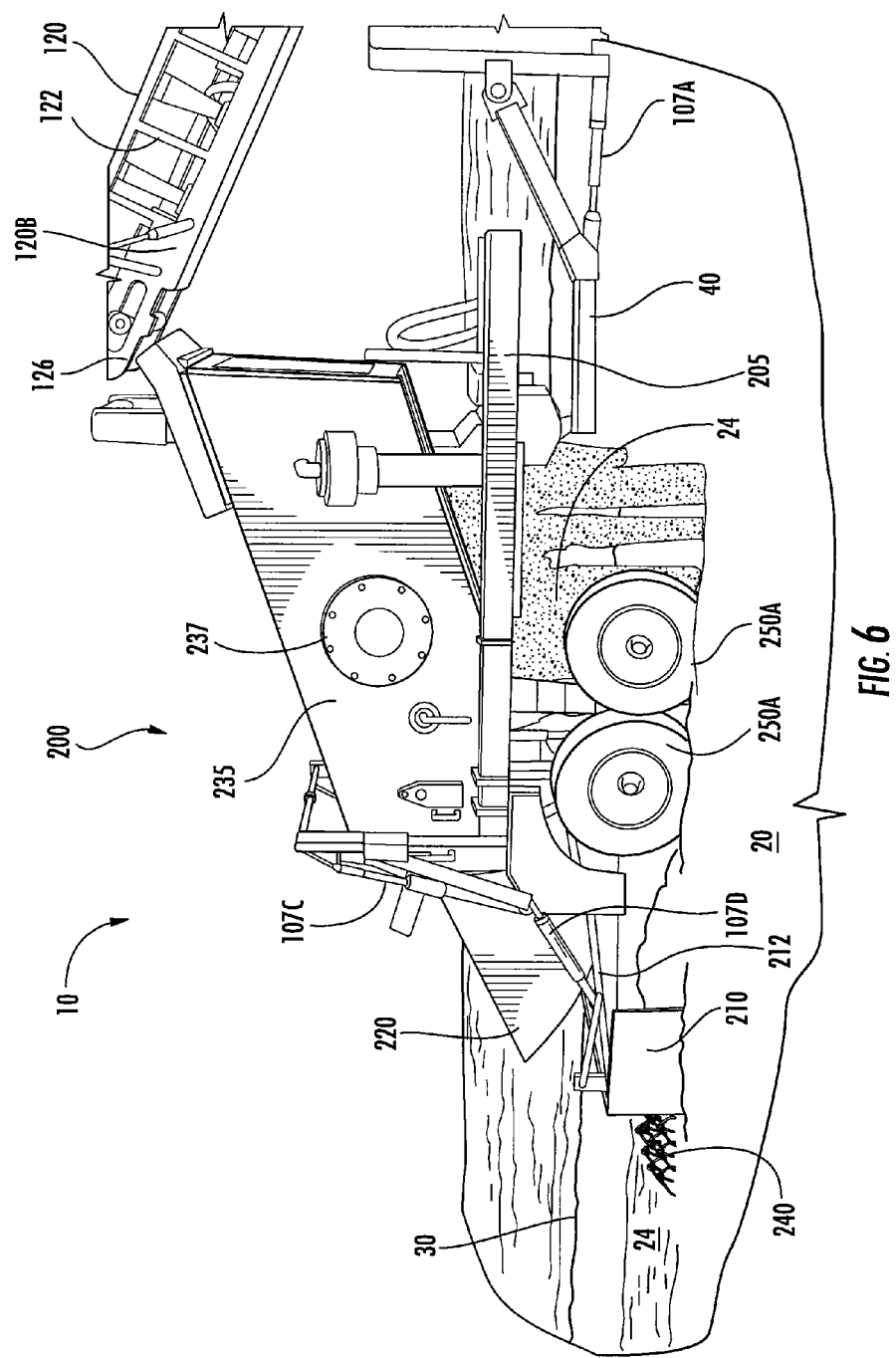
Figure 7:
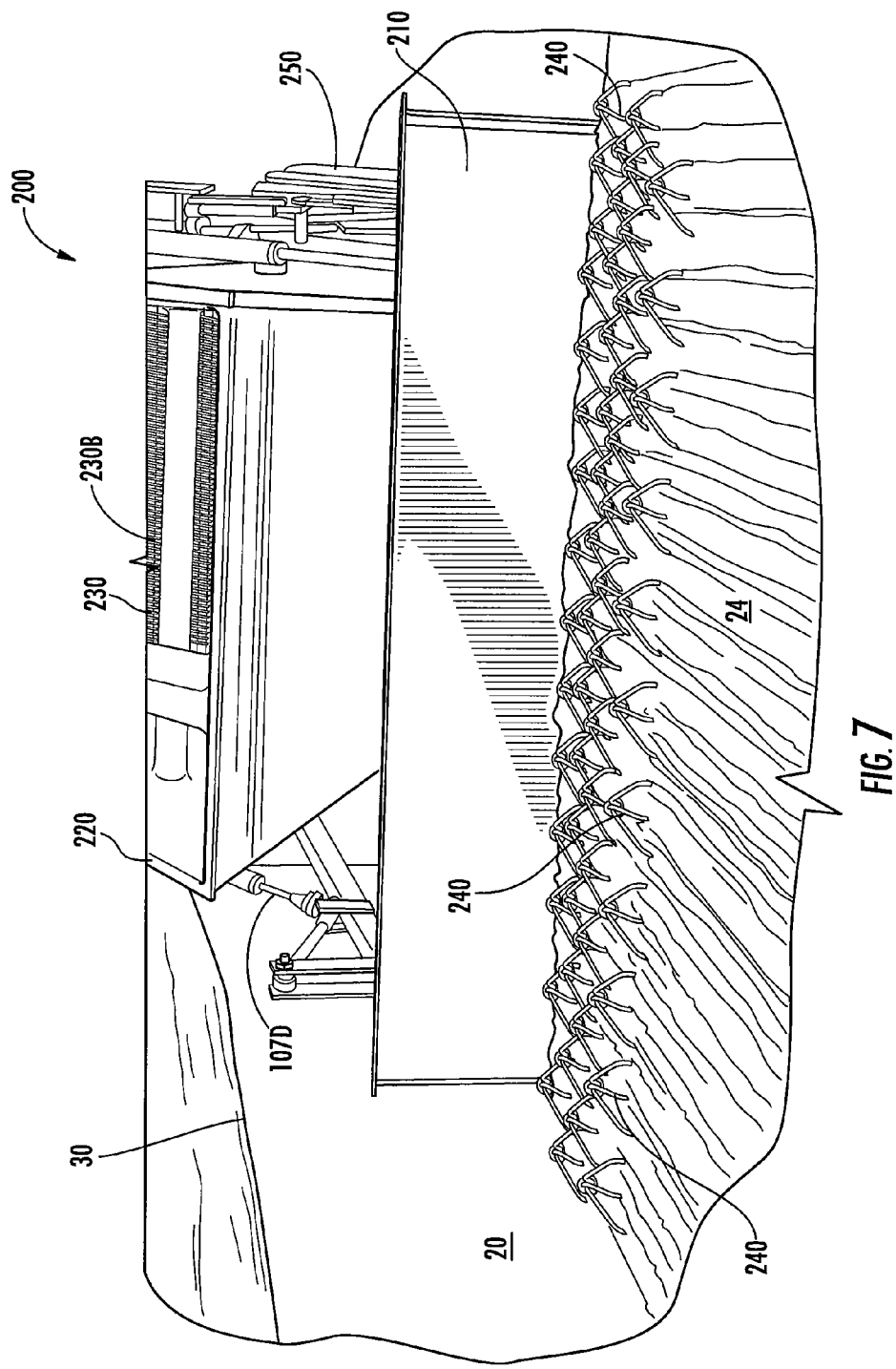

Having thus described embodiments of the present invention in general terms, reference will now be made to the accompanying figures, which are not necessarily drawn to scale, and where:

FIG. 1 illustrates a side elevational view of a sand cleaning apparatus, in accordance with an embodiment of the present invention;

FIG. 2 illustrates a front perspective view of a loader of the sand cleaning apparatus, in accordance with the embodiment of the present invention;

FIG. 3 illustrates a rear elevational view of a trailer of the sand cleaning apparatus, in accordance with the embodiment of the present invention;

FIG. 4 illustrates another front perspective view of the loader, in accordance with the embodiment of the present invention;

FIG. 5 illustrates a rear perspective view of the trailer, in accordance with the embodiment of the present invention;

FIG. 6 illustrates a side elevational view of the trailer, in accordance with the embodiment of the present invention; and FIG. 7 illustrates a rear perspective view of a separator of the trailer, in accordance with the embodiment of the present invention.

DETAILED DESCRIPTION OF EMBODIMENTS OF THE PRESENT INVENTION

Embodiments of the present invention now will be described more fully herein with reference to the accompanying drawings, in which some, but not all, embodiments of the present invention are shown. The present invention may be embodied in many different forms and should not be construed as limited to the embodiments set forth herein; rather, these embodiments are provided so that this disclosure will satisfy applicable legal requirements. It will be understood that, where possible, any of the advantages, features, and/or operational aspects of any of the embodiments described and/or contemplated herein may be included in any other embodiment of the present invention described and/or contemplated herein, and vice versa. It will also be understood that, where possible, any terms expressed in the singular form herein are meant to also include the plural form, and vice versa. Additionally, the terms "a" and/or "an" shall mean "one or more" herein, even though the phrase "one or more" may also be used herein. Like numbers and letters refer to like elements throughout.

Further, it will be understood that various terms and phrases are used herein to describe various advantages, features, and/or operational aspects of the embodiments of the present invention. Sometimes different terms and phrases are used herein but different meanings are not actually implied. For example, the terms "trash," "rocks," and "debris" are sometimes used herein to describe various forms of unwanted material, some of which may be similar or identical. As such, it will be understood that different meanings should not necessarily be ascribed to different terms. Also, in some embodiments, the phrase "sandy surface" generally refers to any surface having an appreciable sand content, such as, for example, a beach, desert, ocean floor, shore line, natural sand pit, golf course bunker, construction site, and/or like. The term "sand" is meant to have a broad meaning herein. It will be understood that sand from various geographic locations have different granule size and composition, from fine grained sand to large grains. Further, as used herein, the phrase "unsifted sand" generally refers to the combination of sand and unwanted material (e.g., trash, debris, tar balls, etc.) that has not yet passed through the one or more sifters of the sand cleaning apparatus described and/or contemplated herein. The term "tar ball" is meant to have an expansive and/or inclusive meaning, which includes, for example, a clump, blob, and/or the like of oil, petroleum, and/or some other hydrocarbon.

In general terms, embodiments of the present invention relate to methods and apparatuses for cleaning, grooming, and otherwise maintaining sand and sandy surfaces. For example, in some embodiments, a sand cleaning apparatus is provided that is configured to travel along a beach parallel to the waterline, collect unsifted sand (e.g., sand plus unwanted material), sift the unsifted sand, and then redeposit the sifted sand back onto the beach. In addition to collecting trash, rocks, debris, and other unwanted material from the beach, the apparatus is also capable of collecting tar balls and otherwise cleaning sand that has been contaminated with oil and/or other hydrocarbons. In addition, the sand cleaning apparatus is relatively light-weight, meaning that the apparatus is able to perform its collecting and sifting functions without substantially disrupting the grading of the sand, without sinking into the sand, and/or without otherwise substantially damaging the beach ecosystem.

Referring now to FIGS. 1-7, a series of views of a sand cleaning apparatus 10 is provided, in accordance with an example embodiment of the present invention. In general terms, as shown in FIGS. 1-3, the apparatus 10 is divided into two main portions, a loader 100 and a trailer 200, where the loader 100 is connected to the trailer 200 via a tow assembly 40. The loader 100 includes a loader frame 105, a feeder assembly 110, a conveyor 120, an operator's cab 130, and tracks 140. The trailer 200 includes a trailer frame 205, a sifter housing 235, a smoother 210, a receptacle 220, a plurality of sifters 230, a plurality of tines 240, and wheels 250.

During operation, the sand cleaning apparatus 10 travels along the beach 20 and/or parallel to the waterline 30 (e.g., from left to right in FIG. 1), collecting unsifted sand 22 in the feeder assembly 110. Unsifted sand 22 that enters the feeder assembly 110 is delivered to the conveyor 120, where the unsifted sand 22 is carried upwardly and rearwardly away from the feeder assembly 110 until it is dumped into the trailer 200. Once the unsifted sand 22 enters the trailer 200, the unsifted sand 22 is passed through the plurality of sifters 230, where trash, rocks, debris, tar balls, and other unwanted material are separated from sand. After being separated, the unwanted material is diverted from the sifters 230 into the receptacle 220 by the force of gravity. At the same time, the sifted sand 24 passes through the plurality of sifters 230 and falls back to the beach 20 by the force of gravity. As shown in FIGS. 5 and 6, the sifted sand 24 falls back to the beach 20 at a location forward of the smoother 210, so that the smoother 210 can then impact the pile of sifted sand 24 and smooth the sifted sand 24 over the beach 20. After contacting the smoother 210, the sifted sand 24 may also be passed through the plurality of tines 240 in order to further spread and/or rake the sifted sand 24 over the beach 20.

Referring now to the sand cleaning apparatus 10 in more detail, the loader 100, as shown in FIG. 1, is supported, borne, and/or otherwise carried (collectively referred to herein as "carried" for simplicity) by the tracks 140, which include first tracks 140A (i.e., the tracks on the right hand side of the apparatus 10) and second tracks 140B (i.e., the tracks on the left hand side of the apparatus 10). The trailer 200 is carried by the four wheels 250, which include the two first wheels 250A (i.e., the two wheels on the right hand side of the apparatus 10) and the two second wheels 250B (i.e., the two wheels on the left hand side of the apparatus 10). The two first wheels 250A are connected to the two second wheels 250B via one or more axles and/or frames. Also, although not shown in the Figures, it will be understood that the two second wheels 250B may be configured similarly to the two first wheels 250A.

As shown in FIGS. 1, 4, 5, and 6, the two first wheels 250A are positioned at and/or near the rear of the trailer 200, such that both wheels 250A are positioned at least partially between the sifter motor 237 (described in more detail below) and the smoother 210. In addition, both of the wheels 250A are also positioned closely together, such that the wheels 250A are positioned near, adjacent, and/or otherwise proximate to each other. This configuration has several advantages over other possible configurations, such as, for example, those where the wheels 250A are spaced apart and/or positioned near the front of the trailer 200. First, because they are positioned closely together, the wheels 250A (and the trailer 200) are able to more closely follow the terrain of the beach 20, which improves the maneuverability of the entire apparatus 10. In addition, as compared to a trailer with spaced-apart wheels, the closely-positioned wheels 250A of the trailer 200 make it less likely that the trailer 200 will get stuck in the sand as it travels along the beach 20. Further, because they are positioned near the rear of the trailer 200, the wheels 250A are positioned closer to the center of gravity of the trailer 200, meaning that the trailer 200 is more balanced and stable as it travels along the beach 20.

In this example embodiment, the loader 100 is embodied as a tractor and is self-propelled. In addition, the loader 100 is configured to pull and/or tow the trailer 200 behind the loader 100, along the beach 20, and/or parallel to the waterline 30 (e.g., from left to right in FIG. 1). However, in other embodiments, the trailer 200 may be self-propelled, such that the trailer 200 is configured to push the loader 100 and/or propel itself along the beach 20 and/or parallel to the waterline 30. In some embodiments, the loader 100 and/or the trailer 200 can move at speeds up to twenty (20) miles per hour. Also, it will be understood that the use of the separate loader 100 and trailer 200 is advantageous because this configuration enables an operator to switch out the trailer 200 for another trailer when, for example, when the trailer 200 and/or a portion thereof becomes inoperable, when the receptacle 220 becomes full of unwanted material, and/or the like.

As shown in FIG. 1, the loader 100 and the trailer 200 are connected to each other by a tow assembly 40 (e.g., tow hitch, tow bar, etc.), which enables both the loader 100 and the trailer 200 to turn and/or otherwise move relative to the tow assembly 40 (and/or each other). This configuration is advantageous because it enables the apparatus 10 to have a smaller turning radius than if the loader 100 were rigidly connected to the trailer 200. Also, it will be understood that the tow assembly 40 includes one or more hydraulic pistons 107A (and/or one or more other actuators (mechanical, hydraulic, electrical, and/or otherwise)) that can be actuated to increase, decrease, and/or otherwise adjust the spacing between the loader 100 and the trailer 200.

Referring now to FIGS. 1 and 5, the loader frame 105 is fastened and/or otherwise connected to the feeder assembly 110, conveyor 120, operator's cab 130, and/or tracks 140. In some embodiments, the tracks 140 carry the loader frame 105, and the loader frame 105 carries the feeder assembly 110, the conveyor 120, and the operator's cab 130. The loader frame 105 is positioned at least partially between the tracks 140 and the conveyor 120. In addition, the operator's cab 130 is positioned at least partially between the feeder assembly 110 and the conveyor 120, which is advantageous because the operator can view the unsifted sand 22 entering the feeder assembly 110 and then travelling up the conveyor 120. As shown in FIGS. 1, 2, and 4, the feeder assembly 110 is positioned forward of the tracks 140, wheels 250, etc. used for movement, so that trash, tar balls, and/or other unwanted material is not pushed, compressed, and/or embedded into the unsifted sand 22 and/or beach 20 prior to cleaning.

Referring now to FIGS. 2 and 4, the feeder assembly 110 includes feeder walls 111, an auger 112, a scoop portion 113, a plurality of paddles 114, and a feeder adjuster assembly 115. The feeder walls 111 include a first feeder wall 111A (e.g., the feeder wall on the right hand side of the apparatus 10) and a second feeder wall 111B (e.g., the feeder wall on the left hand side of the apparatus 10). In some embodiments, the width of the feeder assembly 110 is defined by the distance between the first feeder wall 111A and the second feeder wall 111B. In some embodiments, the feeder walls 111 are tapered outwardly towards the unsifted sand 22 that has not yet entered the feeder assembly 110, such that the width of the feeder assembly 110 decreases from a forward portion of the feeder assembly 110 at and/or near the feeder adjuster assembly 115 towards a rear portion of the feeder assembly 110 at and/or near the conveyor 120. In such embodiments, this configuration of the feeder walls 111 enables the feeder walls 111 to direct unsifted sand 22 towards the paddles 114 and/or the conveyor 120.

In some embodiments, as shown in FIGS. 2 and 4, the auger 112 extends laterally from the front of the apparatus and/or is configured to direct unsifted sand 22 towards the paddles 114 and/or the conveyor 120 for cleaning. Additionally or alternatively, in some embodiments, the width of the auger 112 (and/or the distance between the feeder walls 111) is greater than the width of a single paddle 114. This configuration is advantageous because the apparatus 10 is able to sift a larger area of the beach 20 defined by the width of the auger 112 (and/or the width of the feeder assembly 110) as opposed to a smaller area of the beach 20 defined by the width of the paddle 114.

Additionally or alternatively, in some embodiments, the width of the feeder assembly 110 is greater than or equal to the width of any other portion of the loader 100 and/or any portion of the trailer 200. For example, in some embodiments, the width of the feeder assembly 110, as defined by the distance between the first feeder wall 111A and the second feeder wall 111B, is greater than or equal to the width of the tracks 140, as defined by the distance between the first tracks 140A and the second tracks 140B. This configuration (i.e., a relatively wide feeder assembly 110 that is positioned at the front of the loader 100) is advantageous because it can impede and/or prevent the tracks 140 and/or the wheels 250 from running and/or rolling over at least some of the unsifted sand 22 that has not yet been collected and/or sifted by the apparatus 10. If unsifted sand 22 is run over by the apparatus 10 (or any vehicle), it may be more difficult to collect and/or sift on another pass. In addition, if unsifted sand 22 is run over by any vehicle, the unwanted material in the unsifted sand 22 may be pushed further down into the beach 20, which could result in substantial damage to the beach ecosystem.

Still referring to FIGS. 2 and 4, the auger 112 of the feeder assembly 110 is supported by an auger axle 112A that extends at least partially between the first feeder wall 111A and the second feeder wall 111B. In some embodiments, the auger 112 and/or the auger axle 112A are operatively connected to a motor (not shown), such that the auger 112 rotates about the auger axle 112A when the auger 112 and/or the auger axle 112A are powered by the motor during operation. Also shown in FIGS. 2 and 4, the plurality of paddles 114 are connected to one or more endless chains 114A that extend between the auger axle 112A and a second axle (not shown) that is positioned near (e.g., proximate, adjacent, close to, etc.) the operator's cab 130. In some embodiments, the auger 112, the auger axle 112A, and/or the second axle are operatively connected to a motor (not shown), such that the plurality of paddles 114 and the one or more chains 114A revolve around the auger 112, the auger axle 112A, and the second axle when the auger 112, the auger axle 112A, and/or the second axle are powered by the motor during operation. In some embodiments, the endless chain(s) 114A are operatively connected to the auger axle 112 and/or the second axle by one or more sprockets and/or gears. It will also be understood that, in some embodiments, the auger 112, the auger axle 112A, and/or the second axle are oriented substantially horizontally, parallel with each other, and/or parallel with the beach 20.

During operation, as the loader 100 travels along the beach 20, unsifted sand 22 enters the feeder assembly 110, and the auger 112 rotates about the axis 112A to push and/or otherwise direct the unsifted sand 22 inwardly from the first feeder wall 111A and the second feeder wall 111B towards the revolving paddles 114 and/or the conveyor 120. Thereafter, the paddles 114 cooperate with the auger 112, the scoop portion 113, and the feeder walls 111 to direct the unsifted sand 22 onto the conveyor 120. In some embodiments, the scoop portion 113 of the feeder assembly 110 can be positioned at least partially below the surface of the beach 20 to scoop, shovel, divert, and/or otherwise direct unsifted sand 22, both below and at the surface of the beach 20, towards the auger 112 and/or the paddles 114. In addition, when the scoop portion 113 is positioned at least partially below the surface of the beach 20, the auger 112 and/or the paddles 114 can push, dig, extract, force, collect, and/or otherwise direct unsifted sand 22, both below and at the surface of the beach 20, onto the scoop portion 113 of the feeder assembly 110 and/or onto the conveyor 120. It will be understood that the feeder assembly 110 can be configured and/or positioned, such that the auger 112, the scoop portion 113, and/or the plurality of paddles 114 can collect unsifted sand 22 (and the trash, debris, tar balls, and other unwanted material therein) that is located between the surface of the beach 20 and about two (2) feet below the surface of the beach 20. This feature is advantageous because conventional beach cleaning apparatuses are unable to collect, sift, or access any of the unsifted sand located about two feet below the surface of the beach 20.

It will also be understood that the auger 112 and the plurality of paddles 114 can be configured in any way (e.g., have any shape and/or size, be made from any material, have any relative positioning, etc.), but that, in some embodiments, the paddles 114 are V-shaped and/or are concave to increase the amount of unsifted sand 22 that each paddle 114 can push. In addition, in some embodiments, when viewing the apparatus 10 from the first feeder wall 111A, the auger 112 and/or the plurality of paddles 114 are configured to revolve around the auger 112 in a clockwise direction. In other words, in such embodiments, a single paddle 114 that starts from a location near the operator's cab 130 will rotate over the top of the second axle, travel forwardly and downwardly to the auger axle 112A, rotate down under the bottom of the auger axle 112A, and then move rearwardly and upwardly back to the starting location near the operator's cab 130 in a recirculating path.

As shown in FIGS. 2 and 4, the feeder assembly 110 also includes a feeder adjuster assembly 115. The feeder adjuster assembly 115 includes an adjuster wheel 115A, a vertical member 115B, and a horizontal member 115C. The adjuster wheel 115A is configured to at least partially carry the feeder assembly 110. In addition, the adjuster wheel 115A is configured to rotate and move along the beach 20 in the same direction as the tracks 140 and the wheels 250. As shown in FIG. 2, the vertical member 115B defines a slot therein through which the horizontal member 115C extends. The adjuster wheel 115A is connected to the horizontal member 115C, and the horizontal member 115C may be selectively and vertically moved (e.g., via one or more hydraulic pistons and/or other actuators) within the slot of the vertical member 115B. As such, the horizontal member 115C may be positioned and/or supported at various locations vertically along the slot of the vertical member 115B, thereby enabling the feeder assembly 110 to be adjusted vertically with respect to the tracks 140 and/or the surface of the beach 20.

As shown in FIGS. 1 and 2, the conveyor 120 includes a first portion 120A and a second portion 120B. In some embodiments, the conveyor 120 is oriented and/or carried by the loader 100 such that the conveyor 120 extends from the first portion 120A of the conveyor 120 upwardly and rearwardly towards the second portion 120B. Said differently, in some embodiments, the first portion 120A is positioned ahead of and/or below the second portion 120B. More specifically, in some embodiments, the first portion 120A is positioned near the feeder assembly 110 at a location at least partially between the trailer 200 and the auger 112, and the second portion 120B of the conveyor 120 is positioned near the trailer at a location at least partially above the trailer 200 and/or at least partially between the first portion 120A of the conveyor and the smoother 210. In some embodiments, the conveyor 120 is approximately twenty-eight (28) feet long, and the apparatus 10 is approximately forty (40) feet long.

In addition, as shown in FIGS. 1 and 2, the conveyor 120 includes a conveyor frame 122 and a conveyor belt 124 that, when powered by a motor (not shown), is configured to revolve around the conveyor frame 122 (e.g., via one or more pulley wheels (not shown)). In addition, when powered by the motor, the conveyor belt 124 is configured to transport unsifted sand 22 from the first portion 120A of the conveyor 120 upwardly and rearwardly towards the second portion 120B of the conveyor 120. Thus, it will be understood that, in some embodiments, the conveyor 124 is also an elevator. In addition, in some embodiments, the conveyor 120 is connected to the loader frame 105 via one or more hydraulic pistons 107B, where the one or more hydraulic pistons 107B can be actuated to adjust the position and/or orientation of the conveyor 120 relative to the trailer 200 and/or the frame 105. Still further, in some embodiments, the conveyor 120 optionally includes a guide assembly 126, which is configured to guide the unsifted sand 22 from the conveyor 120 into the trailer 200 and/or onto the sifters 230. In some embodiments, this feature is advantageous because use of the guide assembly 126 may impede and/or prevent unsifted sand 22 from falling and/or blowing off the apparatus 10 as the unsifted sand 22 is being communicated from the conveyor 120 to the trailer 200.

In some embodiments, the conveyor 120 extends along a longitudinal axis defined by a line that passes through the first portion 120A of the conveyor 120 and the second portion 120B of the conveyor 120. In such embodiments, the paddles 114 are interconnected to each other via the endless chain(s) 114A to form a recirculating path of paddles 114 that extends along the longitudinal axis to load unsifted sand 22 on the conveyor 120. Further, in such embodiments, the scoop portion 113 and the auger 112 extend in a direction generally perpendicular and/or at a selected angle to the longitudinal axis, so as to push unsifted sand 22 that is laterally spaced away from the conveyor 120 towards the conveyor 120. As illustrated in FIGS. 2 and 4, the feeder walls 111 are spaced laterally from the longitudinal axis and are configured to direct unsifted sand 22 towards the auger 112 and/or the scoop portion 113, which, in turn, directs the unsifted sand 22 towards the conveyor 120 for cleaning.

Referring now to FIGS. 1 and 3, the sand cleaning apparatus 10 also includes the trailer 200. As shown in FIG. 1, the wheels 250 of the trailer 200 carry the trailer frame 205, and the trailer frame 205 carries and/or is connected to the sifter housing 235, the sifter motor 237, the smoother 210, and/or the receptacle 220. The sifter housing 235 carries, houses, and/or is connected to the sifters 230 and the receptacle 220. The receptacle 220 is connected to the trailer frame 205 and/or the sifter housing 235 via a receptacle member 222 and/or via one or more hydraulic pistons 107C. The smoother 210 is connected to the frame 205 via a smoother member 212 and/or via one or more hydraulic pistons 107D. Further, as shown in FIGS. 1 and 5-7, the trailer 200 also includes a plurality of tines 240 that are carried by and/or connected to the smoother 210.

In some embodiments, the hydraulic piston(s) 107C can be actuated to rotate and/or adjust the position and/or orientation of the receptacle 220 relative to the receptacle member 222 and/or relative to the sifter housing 235. For example, as shown in FIGS. 3 and 5-7, the piston(s) 107C may enable the receptacle 220 to be positioned at least partially below the sifters 230 and/or at least partially between the sifters 230 and the smoother 210, such that the receptacle 220 can receive unwanted material from the sifters 230 (the "receiving position"). It will be understood that, when the receptacle 220 is in the receiving position, the receptacle 220 can receive, and/or at least temporarily carry, at least some of the unwanted material that is collected by and delivered from the sifter(s) 230. Additionally, as shown in FIG. 1, the receptacle 220 may be positioned at least partially above the sifters 230, such that the smoother 210 is positioned at least partially between the receptacle 220 and the sifters 230, and such that the receptacle 220 is positioned may dump and/or otherwise unload the unwanted material out of the receptacle 220 (the "dumping position"). It will be understood that, while the receptacle 220 is in the dumping position, the hydraulic piston(s) 107C may cooperate to rotate the receptacle 220 until the receptacle 220 is positioned upside-down and/or the unwanted material is dumped out of the receptacle 220.

Likewise, in some embodiments, the hydraulic piston(s) 107D can be actuated to rotate and/or adjust the position and/or orientation of the smoother 210 relative to the receptacle 220 and/or the trailer frame 205. For example, as shown in FIGS. 1 and 4-7, the piston(s) 107D may enable the smoother 210 to be positioned at least partially below the sifters 230, at least partially level with the wheels 250, and/or at least partially level with and/or below the surface of the beach 20 (the "smoothing position"). It will be understood that, when the smoother 210 is in the smoothing position, the smoother 210 can impact the sifted sand 24 that falls through the sifter(s) 230 and smooth the sifted sand 24 over the beach 20. Additionally, as shown in FIG. 1, the smoother 210 may be positioned at least partially above the wheels 250 and/or the surface of the beach 20, such that the smoother 210 is positioned in a travelling position (the "travelling position"). It will be understood that the smoother 210 is typically placed in the travelling position when the apparatus 10 is driven on surfaces other than the beach 20 (e.g., asphalt, roads, etc.), thereby protecting the smoother 210 from scraping and/or otherwise contacting the driving surface. While the apparatus 10 is travelling on the beach 20, if the smoother 210 is in the travelling position, the sifted sand 24 that passes through the sifter(s) 230 and falls back to the beach 20 may not be impacted by the smoother 210 and/or any other portion of the apparatus 10.

As shown in FIG. 3, the sifter housing 235 houses, carries, and/or is connected to the sifters 230, which includes a first sifter 230A and a second sifter 230B. In some embodiments, the sifters 230 are positioned in series and/or in a tiered and/or stacked configuration in the sifter housing 235, such that the first sifter 230A is positioned at least partially above and/or at least partially over the second sifter 230B. In some embodiments, the first sifter 230A and the second sifter 230B are the same size and/or shape. In some of these embodiments, the first sifter 230A is positioned directly above and/or directly over the second sifter 230B. Additionally or alternatively, in some embodiments, the first sifter 230A is positioned at least partially between the second sifter 230B and the conveyor 120. As shown in FIGS. 3 and 5, the unsifted sand 22 delivered from the conveyor 120 first passes through the first sifter 230A before passing through the second sifter 230B. As such, the embodiment shown in these Figures is sometimes referred to as a "two-stage" system. This configuration is advantageous because, by passing the unsifted sand 22 through more than one sifter 230, more of the unwanted material can be removed from the unsifted sand 22 by the sifters 230.

Additionally or alternatively, in some embodiments, the first sifter 230A and/or the second sifter 230B are oriented downwardly and/or rearwardly in a direction that extends from the second portion 120B of the conveyor 120 towards the smoother 210 and/or the receptacle 220 (when in the receiving position). In some embodiments, this configuration is advantageous because the unwanted material collected by the sifters 230 can fall into the receptacle 220 by the force of gravity when the receptacle 220 is in the receiving position. In some embodiments, one or more of the sifters 230 are configured and/or treated (e.g., sprayed and/or coated with a lubricant, etc.) to facilitate the unwanted material moving and/or falling from the top surface(s) of the sifter(s) 230 into the receptacle 220. In such embodiments, the configured and/or treated sifters 230 may impede and/or prevent certain unwanted material, such as tar balls, from sticking to surfaces (e.g., mesh screens) of the sifters 230.

In some embodiments, as shown in FIGS. 3 and 5, one or more of the sifters 230 are comprised of one or more mesh screens, such as, for example, one or more wire mesh screens. In some embodiments, the sifter(s) 230 are configured to impede and/or prevent trash, rocks, debris, and/or other unwanted material from passing through the sifters 230, while, at the same time, allowing sifted sand 24 to pass through. Additionally or alternatively, the sifter(s) 230 are configured to separate the sand in the unsifted sand 22 from the unwanted material in the unsifted sand 22. In addition to trash, rocks, and debris, in some embodiments, one or more of the sifters 230 are configured to collect and/or separate one or more tar balls from the sand that passes through the sifter(s) 230. For example, in some embodiments, the mesh screen of a sifter 230 includes and/or defines a plurality of openings 230C, where the openings 230C are small enough to capture a single tar ball and/or other unwanted material. In some of these embodiments, the openings 230C have a width, length, and/or every other dimension that is less than about two (2) millimeters in size. Additionally or alternatively, in some embodiments, the openings 230C are sized to impede and/or prevent any unwanted material (e.g., trash, rocks, debris, tar balls, etc.) equal to or greater than about two (2) millimeters in size from passing through the openings 230C and/or the sifters 230.

In some embodiments, the mesh screen of the second sifter 230B has one or more smaller openings 230C than the one or more openings 230C in the mesh screen of the first sifter 230A. In such embodiments, the area defined by a single opening 230C in the first sifter 230A is larger than the area defined by a single opening 230C in the second sifter 230B. Said differently, the openings 230C of the first sifter 230A are "more coarse" and/or are "less fine" than the openings 230C of the second sifter 230B. Thus, in such embodiments, the unsifted sand 22 may pass through progressively finer sifters as it falls from the conveyor 120 back to the beach 20. In such embodiments, some of the unwanted material from the unsifted sand 22 may pass through the first sifter 230A but still be collected by the second sifter 230B. This configuration is advantageous because the flow of unsifted sand 22 through the sifters 230 can be improved if the unsifted sand 22 passes through a first sifter (e.g., the first sifter 230A) that has larger openings 230C before moving to a second sifter (e.g., the second sifter 230B) that has smaller openings 230C.

In addition, as shown in FIGS. 1 and 4-6, the sifter housing 235 includes and/or carries a sifter motor 237. In some embodiments, the motor 237 is operatively connected to one or more of the sifters 230, such that those sifter(s) 230 are configured to vibrate when powered by the motor 237. More specifically, in such embodiments, the sifter(s) 230 are configured to vibrate relative to the sifter housing 235, which means that sifter(s) 230 vibrate within the sifter housing 235 and the sifter housing 235 does not substantially vibrate. It will be understood that the sifter(s) 230 are typically made to vibrate when unsifted sand 22 passes through those sifter(s) 230, thereby significantly improving the effectiveness of the sifter(s) to separate sand from unwanted material. In other embodiments, the sifter motor 237 is operatively connected to the sifter housing 235, such that the sifter housing 235 is configured to vibrate when powered by the motor 237. In such embodiments, because the sifter housing 235 carries the sifters 230, the sifter housing 235 and the sifters 230 are configured to vibrate together. It will be understood that, in such embodiments, the sifter housing 235 is made to vibrate when unsifted sand 22 passes through the sifter housing 235 and/or the sifters 230.

As shown in FIGS. 1 and 3-7, the trailer 200 also includes a smoother 210 that is carried by the trailer frame 205. It will be understood that the trailer frame 205 and/or the wheels 250 are positioned at least partially between the smoother 210 and the loader 100. Additionally or alternatively, in some embodiments, the smoother 210 is positioned at least partially between the plurality of tines 240 and the wheels 250. As shown, the smoother 210 is connected to the trailer frame 205 via a smoother member 212 and/or via one or more hydraulic pistons 107D. In some embodiments, the hydraulic piston(s) 107D can be actuated to adjust the position and/or orientation of the smoother 210 relative to the trailer frame 205. Further, as shown in FIGS. 1 and 5-7, the trailer 200 also includes a plurality of tines 240 that are carried by the smoother 210. The tine(s) 210 are positioned at least partially behind the smoother 210 and one or more other portions of the trailer 200. In some embodiments, the tines 240 are used to smooth and/or rake the sifted sand 24 that falls through the sifters 230. It will be understood that the plurality of tines 240 are selectively attached to the smoother 210 and can therefore be removed if not needed and/or used.

Of course, it will be understood that the embodiment of the sand cleaning apparatus 10 shown in FIGS. 1-7 is an exemplary embodiment of the present invention and that other embodiments of the present invention may vary. For example, in some alternative embodiments not shown, the loader 100 includes the trailer 200 and/or vice versa, such that all of the portions of the loader 100 and the trailer 200 are connected to and/or carried by a single frame and/or a single vehicle. As another example, in some alternative embodiments, the sifter housing 235 may include only one sifter 230 or may include more than two sifters 230 (e.g., three sifters, five sifters, etc.). As still another example, in some alternative embodiments, the trailer 200 is carried by a plurality of tracks instead of the wheels 250. As another example, in some alternative embodiments, the trailer 200 is carried by a number of wheels 250 different than four (e.g., two wheels, one wheel, six wheels, etc.). As yet another example, in some alternative embodiments, the feeder assembly 110 only includes the paddles 114 and does not include the auger 112.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. In view of this disclosure, those skilled in the art will appreciate that various adaptations, combinations, and modifications of the just described embodiments may be configured without departing from the scope and spirit of the invention. Therefore, it is to be understood that, within the scope of the appended claims, the invention may be practiced other than as specifically described herein.

What is claimed is:

1. An apparatus for cleaning a sandy ground surface, wherein the sandy ground surface comprises unsifted sand, and wherein the unsifted sand comprises sand and unwanted material, the apparatus comprising:
   one or more frames;
   a conveyor carried by the one or more frames and comprising a first portion and a second portion, wherein the conveyor is configured to transport the unsifted sand from the first portion towards the second portion;
   at least one paddle carried by the one or more frames and configured to direct the unsifted sand from the sandy ground surface towards the conveyor; and
   a sifter carried by the one or more frames and configured to:
      receive the unsifted sand from the conveyor;
      prevent the unwanted material from passing through the sifter; and
      allow the sand to pass through the sifter.

2. The apparatus of claim 1, further comprising a receptacle carried by the one or more frames and positioned to receive the unwanted material from the sifter, wherein the receptacle is configured to at least temporarily carry the unwanted material.

3. The apparatus of claim 2, wherein the receptacle is positioned at least partially below the sifter, and wherein the sifter is oriented downwardly towards the receptacle, such that the unwanted material falls, by the force of gravity, from the surface of the sifter and into the receptacle.

4. The apparatus of claim 1, further comprising:
   a loader configured to carry the conveyor and the at least one paddle; and
   a trailer configured to carry the sifter,
   wherein the loader is connected to the trailer and is configured to pull the trailer behind the loader.

5. The apparatus of claim 1, further comprising:
   a second sifter carried by the one or more frames and configured to receive the sand that passes through the sifter,
   wherein the sifter comprises a first plurality of openings and the second sifter comprises a second plurality of openings, and wherein the second plurality of openings are smaller than the first plurality of openings.

6. The apparatus of claim 1, further comprising:
   a motor carried by the one or more frames and configured to cause the sifter to vibrate when the sifter is sifting the unsifted sand.

7. The apparatus of claim 1, further comprising:
   a smoother carried by the one or more frames, wherein the sifter is positioned at least partially between the smoother and the conveyor, and wherein the smoother is configured to smooth the sand over the sandy ground surface after the sand leaves the sifter.

8. The apparatus of claim 1, further comprising:

an auger carried by the one or more frames and configured to direct the unsifted sand from the sandy ground surface towards the at least one paddle.

9. The apparatus of claim 8,
wherein the conveyor extends along a longitudinal axis,
wherein the at least one paddle is a plurality of paddles carried by the one or more frames, wherein the plurality of paddles are interconnected and move along a recirculating path, and wherein the recirculating path extends along the longitudinal axis, and
wherein the auger is oriented perpendicular to the longitudinal axis.

10. The apparatus of claim 1, further comprising:
a feeder assembly comprising a first feeder wall and a second feeder wall, wherein the at least one paddle is located between the first feeder wall and the second feeder wall, and wherein the feeder assembly is configured to direct the unsifted sand toward the at least one paddle.

11. The apparatus of claim 10, further comprising:
a pair of tracks configured to carry the one or more frames, wherein the pair of tracks are positioned at least partially between the feeder assembly and the sifter, such that the unsifted sand enters the feeder assembly before being rolled over by the pair of tracks.

12. The apparatus of claim 1, wherein the unwanted material comprises at least one of trash, debris, or one or more tar balls.

13. The apparatus of claim 1, wherein the sifter comprises a mesh screen, wherein the mesh screen comprises a plurality of openings, and wherein each of the plurality of openings comprises a width of less than about two (2) millimeters.

14. The apparatus of claim 1, wherein the sifter is configured such that the sand that passes through the sifter falls to the sandy ground surface by the force of gravity.

15. An apparatus for sifting unsifted sand located on a sandy ground surface, wherein the unsifted sand comprises sand and unwanted material, the apparatus comprising:
an auger configured to direct the unsifted sand from the sandy ground surface towards a plurality of paddles;
the plurality of paddles carried by one or more frames and configured to direct the unsifted sand towards a sifter, wherein the plurality of paddles are interconnected and move along a recirculating path; and
the sifter configured to prevent the unwanted material from passing through the sifter,
wherein the width of the auger is greater than the width of the plurality of paddles, such that the apparatus sifts a larger area of the sandy ground surface defined by the width of the auger as opposed to a smaller area of the sandy ground surface defined by the width of the plurality of paddles.

16. An apparatus for sifting unsifted sand located on a sandy ground surface, wherein the unsifted sand comprises sand and unwanted material, the apparatus comprising:
an auger configured to direct the unsifted sand from the sandy ground surface towards at least one paddle;
the at least one paddle configured to direct the unsifted sand towards a sifter; and
the sifter configured to prevent the unwanted material from passing through the sifter; and
a plurality of tracks configured to carry the auger and the at least one paddle, wherein the plurality of tracks are positioned at least partially between the at least one paddle and the sifter, such that the unsifted sand is directed towards the sifter before being rolled over by the plurality of tracks,
wherein the width of the auger is greater than the width of the at least one paddle, such that the apparatus sifts a larger area of the sandy ground surface defined by the width of the auger as opposed to a smaller area of the sandy ground surface defined by the width of the at least one paddle.

17. An apparatus for sifting unsifted sand located on a sandy ground surface, wherein the unsifted sand comprises sand and unwanted material, the apparatus comprising:
an auger configured to direct the unsifted sand from the sandy ground surface towards at least one paddle;
the at least one paddle configured to direct the unsifted sand towards a sifter; and
the sifter configured to prevent the unwanted material from passing through the sifter; and
a smoother configured to smooth, along the sandy ground surface, the sand that passes through the sifter, wherein the width of the smoother is greater than the width of the sifter, such that the smoother contacts substantially all of the sand that passes through the sifter,
wherein the width of the auger is greater than the width of the at least one paddle, such that the apparatus sifts a larger area of the sandy ground surface defined by the width of the auger as opposed to a smaller area of the sandy ground surface defined by the width of the at least one paddle.

18. An apparatus for cleaning a sandy ground surface, wherein the sandy ground surface comprises unsifted sand, and wherein the unsifted sand comprises sand and unwanted material, the apparatus comprising:
one or more frames;
a conveyor carried by the one or more frames and comprising a first portion and a second portion, wherein the conveyor is configured to transport the unsifted sand from the first portion towards the second portion, the conveyor extending along a longitudinal axis;
a plurality of paddles carried by the one or more frames and configured to direct the unsifted sand from the sandy ground surface towards the conveyor, wherein the plurality of paddles are interconnected and move along a recirculating path, and wherein the recirculating path extends along the longitudinal axis; and
a sifter carried by the one or more frames and configured to:
receive the unsifted sand from the conveyor;
prevent the unwanted material from passing through the sifter; and
allow the sand to pass through the sifter.

19. The apparatus of claim 18, further comprising a receptacle carried by the one or more frames and positioned to receive the unwanted material from the sifter, wherein the receptacle is configured to at least temporarily carry the unwanted material.

20. The apparatus of claim 19, wherein the receptacle is positioned at least partially below the sifter, and wherein the sifter is oriented downwardly towards the receptacle, such that the unwanted material falls, by the force of gravity, from the surface of the sifter and into the receptacle.

21. The apparatus of claim 18, further comprising:
a loader configured to carry the conveyor and the plurality of paddles; and
a trailer configured to carry the sifter,
wherein the loader is connected to the trailer and is configured to pull the trailer behind the loader.

22. The apparatus of claim 18, further comprising:
a second sifter carried by the one or more frames and configured to receive the sand that passes through the sifter, wherein the sifter comprises a first plurality of openings and the second sifter comprises a second plurality of openings, and wherein the second plurality of openings are smaller than the first plurality of openings.

23. The apparatus of claim 18, further comprising:
a motor carried by the one or more frames and configured to cause the sifter to vibrate when the sifter is sifting the unsifted sand.

24. The apparatus of claim 18, further comprising:
a smoother carried by the one or more frames, wherein the sifter is positioned at least partially between the smoother and the conveyor, and wherein the smoother is configured to smooth the sand over the sandy ground surface after the sand leaves the sifter.

25. The apparatus of claim 18, further comprising:
an auger carried by the one or more frames and configured to direct the unsifted sand from the sandy ground surface towards the plurality of paddles.

26. The apparatus of claim 25, wherein the auger is oriented perpendicular to the longitudinal axis.

27. The apparatus of claim 18, further comprising:
a feeder assembly comprising a first feeder wall and a second feeder wall, wherein the plurality of paddles is located between the first feeder wall and the second feeder wall, and wherein the feeder assembly is configured to direct the unsifted sand toward the plurality of paddles.

28. The apparatus of claim 27, further comprising:
a pair of tracks configured to carry the one or more frames, wherein the pair of tracks are positioned at least partially between the feeder assembly and the sifter, such that the unsifted sand enters the feeder assembly before being rolled over by the pair of tracks.

* * * * *